United States Patent [19]

Trussell, Jr.

[11] 4,272,164
[45] Jun. 9, 1981

[54] BRIGHT SOURCE ATTENUATING DEVICE FOR AN IMAGE INTENSIFIER

[75] Inventor: Charlie W. Trussell, Jr., Woodbridge, Va.

[73] Assignee: The United States of America as represented by the Secretary of the Army, Washington, D.C.

[21] Appl. No.: 51,463

[22] Filed: Jun. 22, 1979

[51] Int. Cl.³ .................................................. G02F 1/17
[52] U.S. Cl. ...................................... 350/357; 350/363
[58] Field of Search ............... 350/357, 356, 355, 354, 350/353, 363, 359

[56] References Cited

U.S. PATENT DOCUMENTS

| | | | |
|---|---|---|---|
| 3,373,091 | 3/1968 | Findl | 204/18 PC |
| 3,521,941 | 7/1970 | Deb et al. | 350/357 |
| 3,589,896 | 6/1971 | Wilcox | 350/357 |

OTHER PUBLICATIONS

M. Yamana, "New Photoelectrochemical Display", Applied Physics Letters, vol. 29, No. 9, Nov. 1, 1976, pp. 570–571.

Primary Examiner—James W. Davie
Attorney, Agent, or Firm—Nathan Edelberg; Robert P. Gibson; Max L. Harwell

[57] ABSTRACT

A device for responding to visible bright light and attenuating these bright lights over a spectral region wherein image intensifiers and the like are sensitive, including the near-infrared, to reduce glare and halation prior to entering the image intensifier and a method of manufacture of said device. The device is comprised of some electrochromic (EC) material sandwiched between two light transparent conductive means wherein one light transparent conductive means has a photoconductive coating in direct contact with the EC material. With a voltage source applying voltage across said two light transparent conductive means, this device remains transparent at low light levels, but when an incoming bright spot is focused on the device, the photoconductive coating conducts at the focal point and the EC material becomes dark at that point, thus absorbing the bright spot. When the bright spot is removed, the darkened area becomes transparent again.

20 Claims, 3 Drawing Figures

BRIGHT SOURCE ATTENUATING DEVICE FOR AN IMAGE INTENSIFIER

The invention described herein may be manufactured, used, and licensed by the U.S. Government for governmental purposes without the payment of any royalties thereon.

BACKGROUND OF THE INVENTION

The present bright source attenuating device may be used at the input of an image intensifier tube to reduce glare and halation from bright light sources that are present in the field-of-view of the image intensifier. This bright source attenuating device is however not intended to be limited to that function. As examples, the present bright source attenuating device may be used as erasable photographic film, as a memory device, in binoculars for monoculars, or in television cameras that are used in high light contrast areas such as at a football game.

The problem of glare was never solved satisfactorily in early design image intensifier tubes, known as first generation image intensifiers, but the glare was limited to a smaller area in the second generation tubes through the use of microchannel plates. The halo problem is still present even in the third generation image intensifier tubes and the image around a bright light is washed out by this halo. The extent of the glare and the diameter of the halo is much greater in the wide gap diode, a third generation tube without a microchannel plate and having a wide gap between the photocathode layer and the phosphor screen. Other electrochromic and photoconductive devices have been patented but none was designed to automatically and selectively attenuate bright spots, especially in the near infrared spectrum, for an imaging device. These previous patents were drawn toward visible display or image recording purposes and were not suitable for image intensifier protection. Three patents that are believed to be exemplary of similar prior art light attenuating devices are U.S. Pat. Nos. 3,373,091; 3,521,941 and 3,589,896.

As far as the inventor knows, no devices of the present type that limit bright sources are presently being used. Internal improvements in the image intensifier tubes, such as antireflective coatings and microchannel plates, have reduced the glare but have not solved the problem. These improvements however do not help in situations where a bright spot activates the current limiting function of the tube power supply and reduces the voltage applied to the tube causing degraded performance over the whole image plane. The present bright source attenuating device responds to visible bright lights and also attenuates these bright lights over the spectral regions where image intensifier tubes are sensitive, including the near-infrared spectral region, and may therefore attenuate a bright source prior to its entry into the tube.

SUMMARY OF THE INVENTION

The present bright source attenuating device is comprised of an electrochromic (EC) material, which may be a solid thin film such as tungsten oxide ($WO_3$), deposited on a photoconductor coating and an appropriate electrolyte solution that is in direct contact with and compatible with said solid thin film, or a liquid, such as polytungsten anion solutions, wherein said tungsten oxide and electrolyte solution or the polytungsten anion solutions are sandwiched between two light transparent conductive means with said photoconductor coating on one side of one of the light transparent conductive means in direct contact with the EC material. A voltage source is connected across said two light transparent conductive means to control the current flow through the electrochromic material and thus the speed of coloration at the interfacing surfaces of the photoconductor coating and the material. The responses of coloration, or the darkening of an area, to a given bright level is adjustable by the use of various photoconductor coatings, EC materials, and the amount of the applied voltage to the two light transparent conductive means. The present device should respond to light levels greater than 1 foot-candle incident on the device. The darkened areas are preferably erased automatically when the bright light source is removed by the use of a clearing agent, such as hydrogen peroxide, in the polytungsten anion solutions. The darkened areas may also be erased by reversing the voltage across the two light transparent conductive means while simultaneously flooding the photoconductor coating with light. Under normal operation, the voltage is negative on the light transparent conductive means that has the photoconductor coating thereon, and to erase the darkened area the voltage would then be reversed or be positive on the photoconductor coating. The photoconductor coating is preferably cadmium sulfide since it has high sensitivity in the desired spectral range and the two light transparent conductive means are preferably indium-tin-oxide alloys because of their low resistivity and high light transmission characteristics.

Some of the novel features of the present bright source attenuating device are as follows: (1) the automatic, selective, and local attenuation of bright spots in an image, (2) no adverse effects on low light level imaging performance except for a 20% transmission loss, (3) can be made to respond to visible or infrared sources by choice of photoconductor coating material, (4) can be made to attenuate various wavelength bands by choice of various EC materials, or by other attenuating mediums in which the EC material is replaced by one of a variety of workable non-metal, or metal, electroplating solutions, such as copper sulfate, wherein metals will attenuate over the larger range wavelengths and over a broad spectrum thereof, (5) response to a given light level is adjustable by proper use of different photoconductors, EC materials, and applied voltages, (6) darkened areas may be erased automatically by the use of variable persistence materials or manually by reversing the voltage while flooding the device with light, (7) the device may be built directly on an image intensifier tube, or may be fabricated as a separate unit, or (8) may be operated from a low voltage source, such as a battery.

The invention will be better understood by explanation herein below with reference to the following drawings.

DETAILED DESCRIPTION OF THE EMBODIMENT

Figure 1:
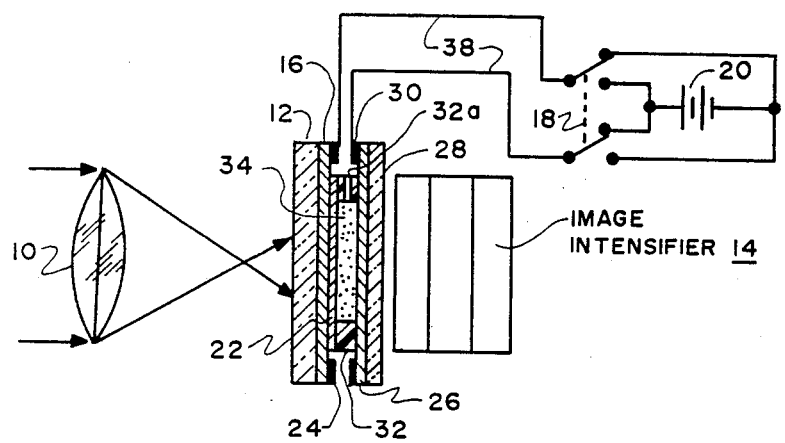
FIG. 1 illustrates one embodiment of the present invention in proximity to the input of an image intensifier tube.

Even though all three embodiments of the bright source attenuating device are shown as a light limiter for an image intensifier tube, their functions are not limited thereto. The embodiment of FIG. 1 is constructed by applying a transparent conductive coating 16 to a glass plate 12 and by applying a photoconductor coating 22 on the central portion of the transparent conductive coating 16. Coatings 16 and 22 may be deposited by sputtering methods, or other means. A metallic ohmic contact ring 24 is deposited on the outer perimeter of the transparent conductive coating 16, surrounding the photoconductor coating 22. On a second glass plate 28, another transparent conductive coating 26 is deposited. Transparent conductive coatings 16 and 26 are designated herein as two light transparent conductive means. A metallic ohmic contact ring 30 is deposited on the outer perimeter of one side of transparent conductive coating 26. The two light transparent conductive means may be made of indium-tin-oxide ($In_2O_3/SnO_2$ alloys) because of low resistivity and high light transmission characteristics. Indium oxide ($In_2O_3$) and tin oxide ($SnO_2$) thin metal films or other similar transparent conductive films, which are compatible with adjoining materials, may also be used. The indium oxide and tin oxide films are normally 0.1 to 1.0 micrometer thick and may be polished to reduce light scatter. An insulating ring 32 with a hole on one side, represented as 32a, is sealed by an appropriate adhesive, such as an epoxy that is compatible with the other material that it is in contact with, between the photoconductor coating 22 and the transparent conductive coating 26. The cavity formed by ring 32 and coatings 22 and 26 is filled with an electrochromic material 34 and the hole 32a is then sealed. Alternatively, a thin film EC material like tungsten oxide may be deposited on the photoconductor coating 22 and the cavity filled with a compatible electrolyte solution. Electrical leads 38, leading back through a double-pole, double-throw switch 18 to a voltage source 20, are bonded to the two metal ohmic contact rings 24 and 30 within the negative potential of the voltage source 20 is connected to the light transparent conductive coating that is contiguous with the photoconductor coating 22, i.e. coating 16. The two metal ohmic contact rings 24 and 30 are preferably made of gold. Insulating spacer ring 32 may be made of plastic or glass with an epoxy seal which will not dissolve in the EC materials. The device is positioned in the proximity of the input to the image intensifier tube 14. The bright source attenuating device may also be reversed, i.e. wherein the photoconductor coating is inboard to the image intensifier from the EC material.

The critical materials needed for proper operation of the present device are the two light transparent conductive means, the photoconductor coating, and the electrochromic material. The conductive means 16 and 30 have already been defined as preferably indium-tin-oxide alloys, indium oxide, or tin oxide. The preferred material for the photoconductor means 22 is cadmium sulfide (CdS) that is prepared to have high photoconductive gain. CdS has high sensitivity in the visible spectral range from 0.4 microns to 0.6 microns depending on the impurities incorporated in the material, and has high transmission in the spectral region from 0.6 microns to 0.9 microns as required by the image intensifier device. Impurities such as copper and silver may be introduced to make the CdS a more sensitive photoconductor as needed, and also to shift the spectral range. Thicknesses of the CdS film may be from 0.5 microns to 10 microns, with 2-3 microns being a generally preferred thickness. Other photoconductors that may be used in this device are cadmium-selenide or zinc sulfide.

There are various electrochromic materials that are suitable for use in the present device. The main requirements for the EC materials are as follows: (1) good absorption in the near infrared spectral region, i.e. 0.6 micron to 0.9 micron spectral region, when the EC material is activated and good transmission in this spectral region when the EC material is not activated; (2) the EC material should automatically become transparent when activating current ceases, or be erasable by reversing the current; and (3) the EC material should be compatible with the other materials which it contacts in the device, i.e. the photoconductor coating, the transparent conductive means, the insulating spacer ring, and the adhesive materials. Examples of suitable EC materials sandwiched between the two light transparent conductive means are polytungsten anion solutions that are self erasing when the bright source is removed by having a clearing agent in the solution, such a hydrogen peroxide, a solid thin film tungsten oxide ($WO_3$) with an electrolyte solution compatible with the acids in the tungsten oxide in direct contact with one side of the tungsten oxide in which the bright source is erased by reversing the voltage, or with either a metallic electroplating solution, such as copper-sulfate, or non-metallic electroplating solution wherein these electroplating solutions are self erasing when the bright source is removed.

In a specific embodiment as shown in FIG. 1, a device was prepared by sputtering a 3 micron thick cadmium-sulfide film 22 on a transparent conductive film 16 of indium-tin-oxide deposited on a glass plate 12. Transparent conductive film 26 is then deposited on glass plate 28 and the insulating spacer ring 32 and the cavity is filled with an electrochromic solution comprised of 100 grams $H_2O$ with 0.01% to 0.2% $H_2O_2$, 1 to 20 grams sodium tungstate ($Na_2WO_4.2H_2O$), and 1 to 20 grams chloroacetic acid ($ClCH_2COOH$). A 3 d.c. volts voltage from source 20 was applied to the electrical leads 38 and insignificant current was drawn when no bright lights were focused on the device. The device darkened at points where a bright light source was focused and dark lines which persisted for a few seconds could be drawn by moving the spot of light across the device. The light source that was used is a microscope light at 2 meters focused with a 2 inch diameter f/2 lens to a small spot. This particular electrochromic material solution automatically erased dark spots when the bright spots were removed.

Figure 2:
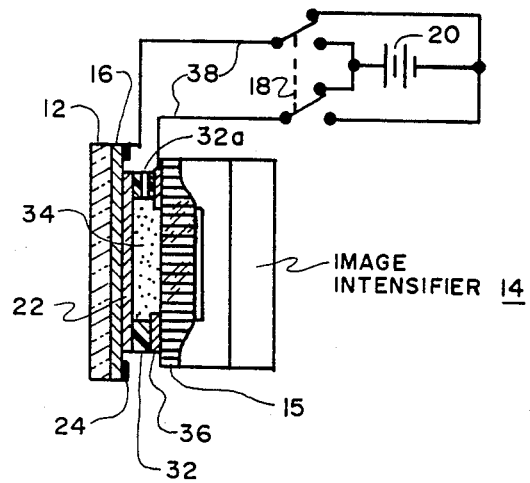
FIG. 2 shows a second embodiment of the present invention wherein the device is built directly on the tube.
Figure 3:
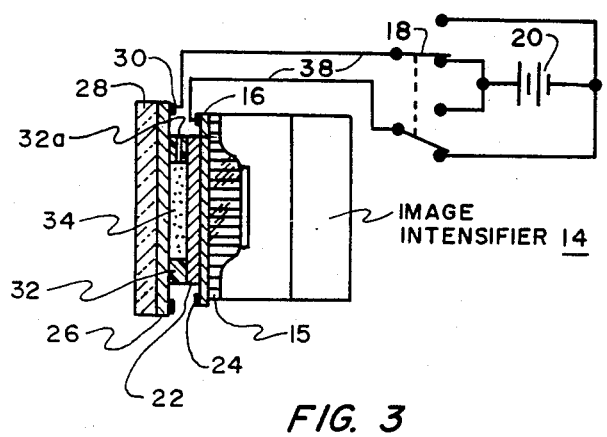
FIG. 3 is still another embodiment of the present device built directly on the tube.

FIGS. 2 and 3 illustrate two embodiments where the bright source attenuating device is slightly modified from the embodiment of FIG. 1 and in these cases the device is attached directly to the input faceplate 15, usually a fiber optic type faceplate, of the image intensifier tube 14. As can be clearly seen in FIG. 2, the transparent conductive means 26, contact ring 30, and glass plate 28 are no longer present, but a metal ring anode 36 is bonded to the faceplate 15 and to the insulating spacer ring 32 prior to filling the cavity with the electrochromic material. FIG. 3 shows an embodiment of the bright source attenuating device, reversed, or turned around, from what it was in FIG. 1 and with glass plate 12 no longer present but the transparent conductive means 16 being adhesed directly to faceplate 15. The polarity of the voltage source 20 has been reversed by switch 18 since negative voltage needs to be in contact with the transparent conductive means that is in direct contact with the photoconductor coating 22 for proper operation. In operation, the device is positioned near the image plane at the input of an image intensifier 14 and a voltage is applied to the electrical leads with the photoconductive side being negative. At low light levels the photoconductor will have a high resistance and very little current will flow through the electrochromic material so that the device will remain transparent and transmit at least 80% of the image light.

When a bright light appears in the field-of-view and is imaged onto the device, the photoconductor will conduct current at the areas where the light is sufficiently bright in the image and a light absorbing dye inherent in the EC materials will be deposited on the photoconductor at those areas where current flows. The bright areas will thus be attenuated in proportion to the brightness of the image for the light levels above a threshold value. Other areas will remain transparent and the image intensifier will continue to function normally in the areas other than at the bright spots. When the bright light disappears from an area on the photoconductor, the dye will also disappear by chemical reaction, or may be erased by reverse electrical currents. If a bright spot moves across the image, a dark spot will follow to attenuate the light and disperse when the light is removed.

I claim:

1. A bright source attenuating device for automatically attenuating bright sources in the image plane of an image intensifier, said device comprising:
   two light transparent conductive means;
   a photoconductor coating deposited on one side of one of said two light transparent conductive means;
   an insulating spacer ring that forms a cavity between said two light transparent conductive means wherein said photoconductor coating is on the inner wall of said cavity;
   an electrochromic material filling the entire volume of said cavity; and
   a voltage source switchably connected across said two light transparent conductive means with the negative side of said voltage source connected to the one of said two light transparent conductive means upon which said photoconductor coating is deposited wherein said device remains transparent to low energy light levels but wherein a bright light focused on said device causes said photoconductor coating to conduct at the point where said bright light is focused while simultaneously said electrochromic material deposits an internal dye to create a dark point at said point of conduction on said photoconductor coating in which said dye absorbs said bright light portion of the image whereby the removal of said bright light causes current flow to cease through said electrochromic material and said dark point to become transparent again.

2. A device as set forth in claim 1 wherein said electrochromic material is a polytungsten anion solution comprising hydrogen peroxide as a dye clearing agent.

3. A device as set forth in claim 1 wherein said electrochromic material is an electrochromic solution prepared with 100 grams $H_2O$, with 0.01% to 0.2% $H_2O_2$, 1 to 20 grams sodium tungstate ($Na_2WO_4.2H_2O$), and 1 to 20 grams chloroacetic acid ($ClCH_2COOH$).

4. A device as set forth in claim 3 wherein said photoconductor coating is from 0.5 micrometer to 10 micrometer thick cadmium-sulfide film.

5. A device as set forth in claim 4 wherein said two light transparent conductive means are two layers of indium-tin-oxide alloys from 0.1 to 1.0 micrometer thick.

6. A device as set forth in claim 5 wherein said insulating spacer ring is made of plastic and seals in said electrochromic material and is adhesed to adjacent materials by an epoxy that is compatible with said electrochromic materials, said light transparent conductive means, and said photoconductor coating.

7. A device as set forth in claim 6 wherein said two light transparent conductive means are further comprised of metallic ohmic contact rings on their perimeter in which electrical leads from said voltage source are bonded thereto for electrical contact.

8. A device as set forth in claim 7 wherein said metallic ohmic contact rings are made of gold.

9. A device as set forth in claim 8 wherein said two light transparent conductive means are each deposited on a glass plate wherein one of said light transparent conductive means having said photoconductor coating thereon receives an imaging input from a scene being observed and the glass plate upon which the other of said light transparent conductive means is deposited is in close proximity to the input side of said image intensifier tube.

10. A device as set forth in claim 8 in which one of said two light transparent conductive means is deposited on a glass plate with the other of said two light transparent conductive means having said photoconductor coating deposited thereon adhesed directly to the input faceplate of said image intensifier whereby an imaging input from a scene being observed enters through said glass plate and the one of said two light transparent conductive means through said electrochromic material into the input of said image intensifier.

11. A device as set forth in claim 1 wherein said electrochromic material is a tungsten oxide ($WO_3$) thin film.

12. A device as set forth in claim 1 wherein said electrochromic material is a workable metal electroplating solution.

13. A device as set forth in claim 12 wherein said workable metal electroplating solution is copper sulfate.

14. A device as set forth in claim 1 wherein said electrochromic material is a workable non-metal electroplating solution.

15. A device as set forth in claim 4 wherein said cadmium-sulfide film has copper and silver impurities therein to make said cadmium-sulfide films more sensitive in the 0.4 micron to 0.6 micron region.

16. A device as set forth in claim 3 wherein said photoconductor coating is cadmium-selenide.

17. A device as set forth in claim 3 wherein said photoconductor coating is zinc-sulfide.

18. A device as set forth in claim 4 wherein said two light transparent conductive means are made of indium oxide.

19. A device as set forth in claim 4 wherein said two light transparent conductive means are made of tin oxide.

20. A bright source attenuating device for automatically attenuating bright sources in the image plane of an image intensifier, said device comprising:

a light transparent conductive means deposited on a glass plate;

a photoconductor coating deposited on said light transparent conductive means;

a metal ring anode attached directly to an input faceplate of said image intensifier;

an insulating spacer ring that forms a cavity between said light transparent conductive means and the input faceplate of said image intensifier surrounded by said metal ring anode wherein said photoconductor coating is on the inner wall of said cavity;

an electrochromic material filling the entire volume of said cavity with said electrochromic material in direct contact with said input faceplate; and a voltage source switchably connected across said light transparent conductive means and said metal ring anode with the negative side of said voltage source connected to said light transparent conductive means upon which said photoconductor coating is deposited wherein said device remains transparent to low energy light levels but wherein a bright light focused on said device causes said photoconductor coating to conduct at the point where said bright light is focused while simultaneously said electrochromic material deposits an internal dye to create a dark point at said point of conduction on said photoconductor coating in which said dye absorbs said bright light portion of the image whereby the removal of said bright light causes current flow to cease through said electrochromic material and said dark point to become transparent again.

* * * * *